(12) United States Patent
    Lee et al.

(10) Patent No.: US 12,613,591 B2
(45) Date of Patent: Apr. 28, 2026

(54) TOUCH DISPLAY DEVICE AND TOUCH DRIVING METHOD

(71) Applicant: LG Display Co., Ltd., Seoul (KR)

(72) Inventors: JaeHo Lee, Paju-si (KR); MinHo Sohn, Paju-si (KR); Jiseok Yang, Paju-si (KR); Kyuhwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/789,381

(22) Filed: Jul. 30, 2024

(65) Prior Publication Data

US 2025/0053295 A1 Feb. 13, 2025

(30) Foreign Application Priority Data

Aug. 9, 2023 (KR) ........................ 10-2023-0103848

(51) Int. Cl.
    *G06F 3/0488* (2022.01)
    *G06F 3/0354* (2013.01)
    *G06F 3/041* (2006.01)
    *G06F 3/042* (2006.01)
    *G06F 3/14* (2006.01)

(52) U.S. Cl.
    CPC ...... *G06F 3/04162* (2019.05); *G06F 3/03545* (2013.01); *G06F 3/0412* (2013.01); *G06F 3/0416* (2013.01); *G06F 3/04166* (2019.05); *G06F 3/041661* (2019.05); *G06F 3/042* (2013.01); *G06F 3/0488* (2013.01); *G06F 3/14* (2013.01); *G06F 3/04184* (2019.05)

(58) Field of Classification Search
    CPC .. G06F 3/03545; G06F 3/0383; G06F 3/0412;
    G06F 3/0416; G06F 3/04162; G06F 3/04166; G06F 3/041661; G06F 3/04184; G06F 3/0441; G06F 3/0442; G06F 3/0446; G06F 3/0488; G06F 3/14; G06F 3/042
    See application file for complete search history.

(56) References Cited

U.S. PATENT DOCUMENTS

| | | | | |
|---|---|---|---|---|
| 8,581,852 B2 * | 11/2013 | Izadi | ..................... | G06F 3/0425 |
| | | | | 345/173 |
| 9,262,015 B2 * | 2/2016 | Avrahami | ............. | G06F 1/1686 |
| 9,740,327 B2 * | 8/2017 | Choi | ..................... | G06F 3/0416 |
| 9,830,021 B2 * | 11/2017 | Sasaki | .................. | G02B 27/026 |
| 2017/0017393 A1 * | 1/2017 | Luo | ..................... | G06F 3/04812 |
| 2018/0032156 A1 * | 2/2018 | Bostick | ............. | G06K 7/10722 |

FOREIGN PATENT DOCUMENTS

| | | | | | |
|---|---|---|---|---|---|
| CN | 111950529 B | * | 5/2023 | ............. | G06V 10/17 |
| WO | WO-2017132258 A1 | * | 8/2017 | ............. | G06V 40/13 |

* cited by examiner

*Primary Examiner* — Julie Anne Watko
(74) *Attorney, Agent, or Firm* — Seed Intellectual Property Law Group LLP

(57) ABSTRACT

A touch display device comprising a display panel including a plurality of subpixels, a driving circuit configured to drive the display panel, and a timing controller configured to control a normal mode of operation to display a first image or a touch mode of operation to display a second image in a display period and to emit a touch pattern including coordinate information in a touch period, based on a touch state of a stylus, wherein the stylus generates coordinate data by detecting the touch pattern in the touch period. A width of a scan signal supplied to the display panel is controlled based on a length of the touch period in the touch mode.

17 Claims, 14 Drawing Sheets

200

S100 — Stylus Touch ?

N

Y

S300 — Touch Mode

S400 — Determining Stylus Coordinate

S500 — Tracking Touch Positions

Normal Mode — S200

S100 — Stylus Touch ?

Y

N

S300 — Touch Mode

S350 — Global Driving for Touch Pattern

S400 — Determining Stylus Coordinate

S450 — Local Driving for Touch Pattern

S500 — Tracking Touch Positions

Normal Mode — S200

TOUCH DISPLAY DEVICE AND TOUCH DRIVING METHOD

CROSS-REFERENCE TO RELATED APPLICATION

This application claims priority from Korean Patent Application No. 10-2023-0103848, filed on Aug. 9, 2023, which is hereby incorporated by reference for all purposes as if fully set forth herein.

BACKGROUND

Technical Field

Embodiments of the disclosure relate to a touch display device and a touch driving method.

Description of the Related Art

The growth of the intelligent society leads to increased demand for various types of display devices. Various display devices, such as liquid crystal displays, electroluminescent displays, or quantum dot light emitting displays, are being used.

The display device recognizes the user's finger touch or a pen touch on the display panel and performs input processing based on the recognized touch so as to provide more various functions.

As an example, a display device capable of touch recognition may include a plurality of touch electrodes arranged or embedded in a display panel and detect the presence of the user's touch on the display panel and coordinates of a touch by driving the touch electrodes.

Such touch display devices are in a trend of being adopted in more sectors, such as for large-scale touch display devices, such as vehicle displays and showcase displays, as well as mobile devices, such as smartphone or tablet PCs.

In this case, the touch function for the touch display device may use not only a passive stylus, such as a finger, but also an active stylus capable of transmitting and receiving signals to and from the display panel.

BRIEF SUMMARY

The inventors of the disclosure have invented a touch display device and a touch driving method capable of detecting a touch without an infrared pattern layer.

Embodiments of the disclosure may provide a touch display device and a touch driving method that facilitate touch detection by emitting a touch pattern through a display panel.

Embodiments of the disclosure may provide a touch display device and a touch driving method capable of achieving a process optimization and lightness by not forming a separate infrared pattern layer on the display panel.

Embodiments of the disclosure may provide a touch display device and a touch driving method capable of reducing luminance changes and effectively detecting a touch by controlling a driving current depending on a pattern period that emits a touch pattern.

Embodiments of the disclosure may provide a touch display device comprising a display panel including a plurality of subpixels, a driving circuit configured to drive the display panel, and a timing controller configured to control a normal mode that displays an image, or a touch mode that displays an image and a touch pattern depending on a touch state of a stylus.

Embodiments of the disclosure may provide a touch driving method comprising a step of determining whether a stylus is touched, a step of operating in normal mode for displaying an image when there is no touch by the stylus, a step of operating in touch mode for displaying an image and a touch pattern when there is a touch by the stylus, a step of determining coordinates of the stylus in the touch mode, and a step of tracking touch positions of the stylus.

According to embodiments of the disclosure, it is possible to detect a touch without an infrared pattern layer.

According to embodiments of the disclosure, it is also possible to facilitate touch detection by emitting a touch pattern through a display panel.

According to embodiments of the disclosure, it is also possible to achieve a process optimization and lightness by not forming a separate infrared pattern layer on the display panel.

According to embodiments of the disclosure, it is also possible to reduce luminance changes and effectively detect a touch by controlling a driving current depending on a pattern period that emits a touch pattern.

DESCRIPTION OF THE SEVERAL VIEWS OF THE DRAWINGS

The above and other objects, features, and advantages of the disclosure will be more clearly understood from the following detailed description, taken in conjunction with the accompanying drawings, in which.

DETAILED DESCRIPTION

Figure 1:
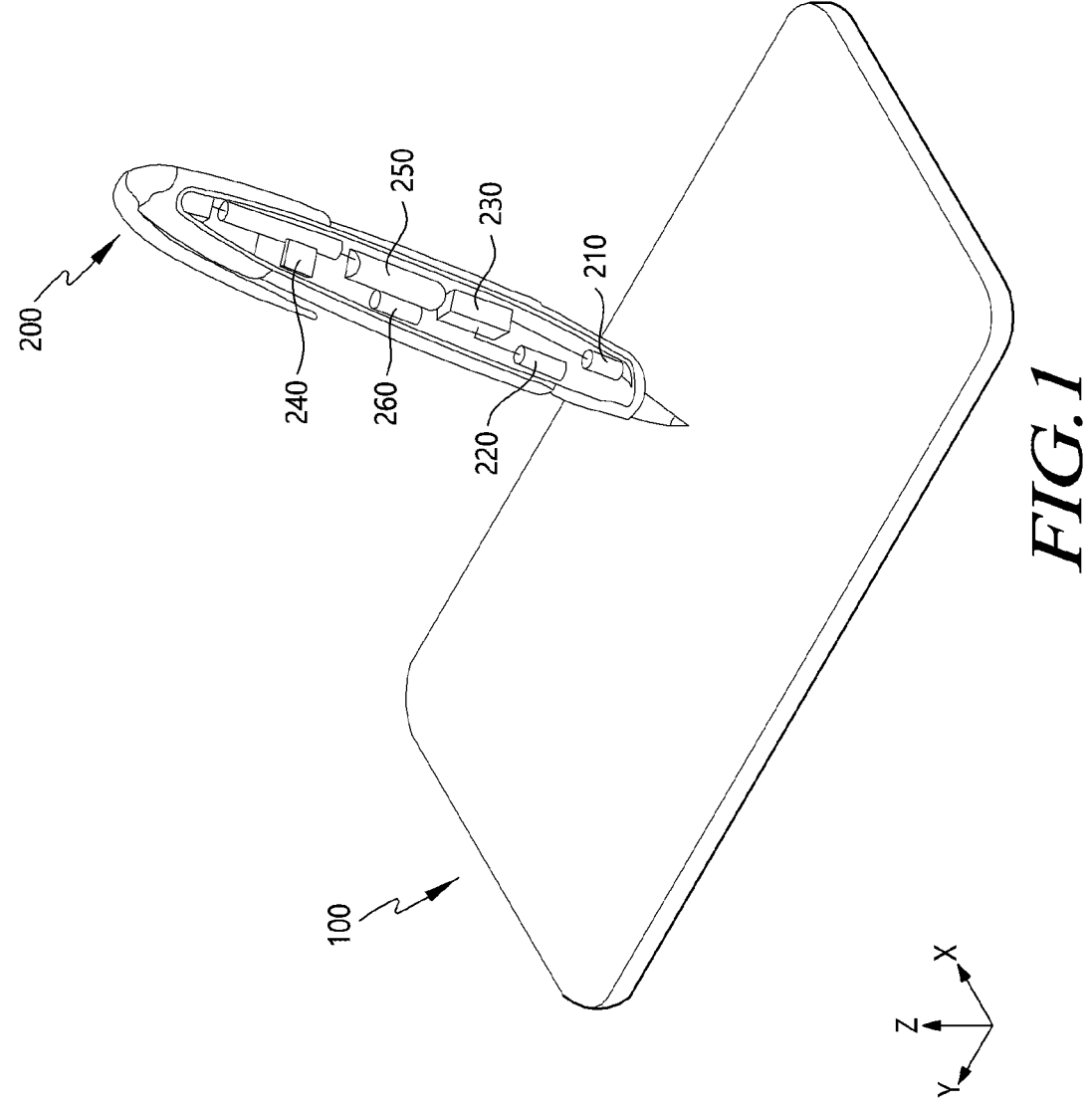
FIG. 1 is a perspective view illustrating a touch sensing system according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

Figure 2:
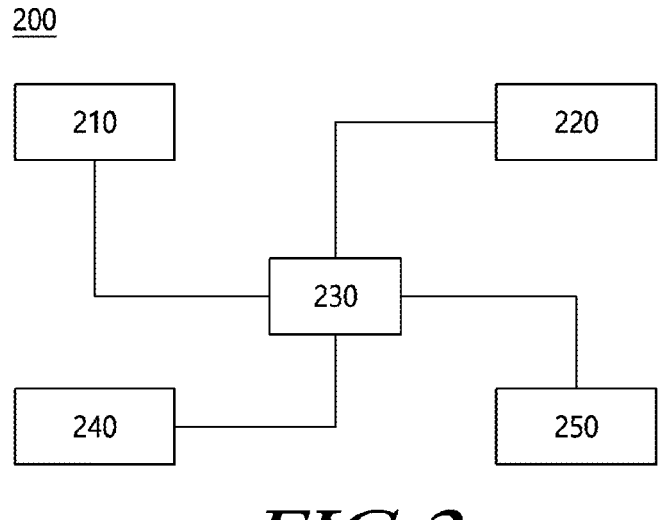
FIG. 2 is a block diagram conceptually illustrating a stylus in a touch sensing system according to embodiments of the disclosure.
Figure 3:
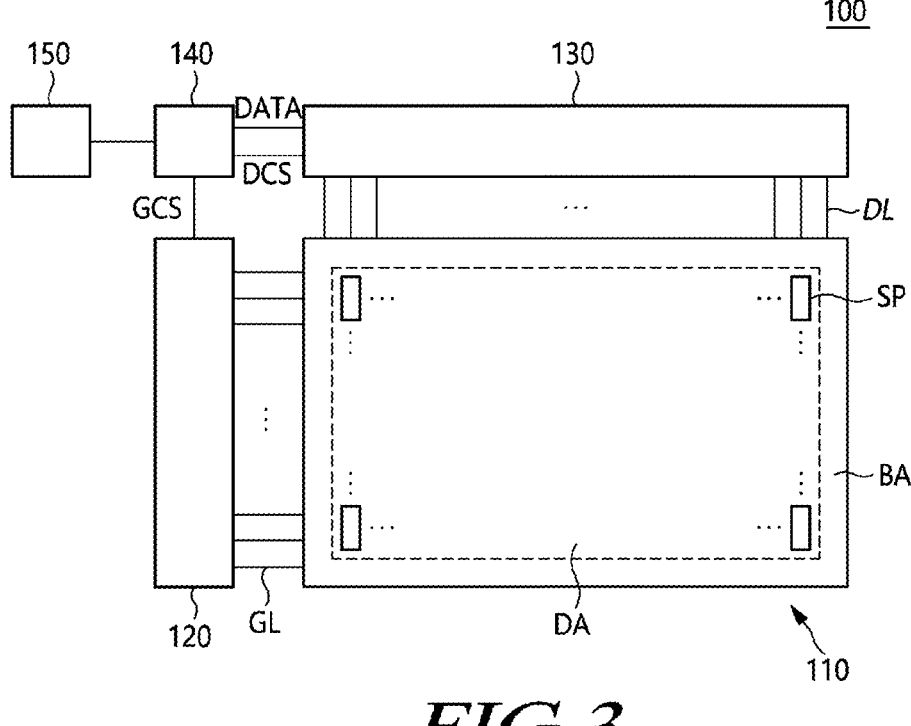
FIG. 3 is a block diagram schematically illustrating a touch display device in a touch sensing system according to embodiments of the disclosure.

FIG. 1 is a perspective view illustrating a touch sensing system according to embodiments of the disclosure. FIG. 2 is a block diagram conceptually illustrating a stylus in a touch sensing system according to embodiments of the disclosure. FIG. 3 is a block diagram schematically illustrating a touch display device in a touch sensing system according to embodiments of the disclosure.

Referring to FIGS. 1 to 3, a touch sensing system according to embodiments of the disclosure may include a touch display device 100 and a stylus 200.

The stylus 200 may include an optical sensor 210, a touch sensor 220, a processor 230, a communication module 240, a memory 250, and a battery 260.

The stylus 200 may be a smart pen or active pen capable of generating coordinate data using an optical method.

The optical sensor 210 may be placed in front of the stylus 200. The optical sensor 210 may detect a touch pattern emitted from the touch display device 100. The touch pattern emitted from the touch display device 100 may have a wavelength in the visible light band, or may have a wavelength in the infrared or ultraviolet band.

The optical sensor 210 may continuously detect touch patterns at a corresponding location following the movement of the stylus 200, and provide pattern information detected from the touch pattern to the processor 230.

The touch sensor 220 may sense a state in which the stylus 200 is close to or in contact with the touch display device 100. The touch sensor 220 may sense the pressure applied by the stylus 200 to the touch display device 100 or may sense a change in capacitance when approaching or closing to the touch display device 100. The touch sensor 220 may provide pressure information of the stylus 200 to the processor 230. However, this is an example, and the touch sensor 220 may be replaced with a sensor element capable of detecting a contact between the stylus 200 and the touch display device 100, and/or a situation in which the stylus 200 approaches the touch display device 100 within a predefined distance, etc.

The processor 230 may receive at least one piece of pattern information from the optical sensor 210. The processor 230 may convert the pattern information into a data code and generate coordinate data using the data code.

In this case, the processor 230 may quickly generate coordinate data without complex computations or corrections by converting the pattern information into a one-to-one corresponding data code. Therefore, the touch sensing system of the disclosure may reduce power consumption and simplify driving operations.

The processor 230 may transmit the generated coordinate data to the touch display device 100 through the communication module 240.

The communication module 240 may perform wired or wireless communication with an external device. For example, the communication module 240 may transmit and receive wired or wireless signals with the communication circuit of the touch display device 100.

The memory 250 may store data for the driving operation of the stylus 200. Since the stylus 200 may convert the pattern information into corresponding data code and may directly provide the coordinate data generated therefrom to the touch display device 100, the stylus 200 may include a memory 250 having a capacity corresponding to one piece of infrared pattern information.

The touch display device 100 according to embodiments of the disclosure may include a display panel 110 and a driving circuit for driving the display panel 110.

The display panel 110 may include a display area DA in which images are displayed and a bezel area BA in which no image is displayed. The bezel area BA may also be referred to as a non-display area.

The display panel 110 may include a plurality of subpixels SP for displaying images. For example, a plurality of subpixels SP may be disposed in the display area DA. In some cases, at least one subpixel SP may be disposed in the bezel area BA. At least one subpixel SP disposed in the bezel area BA is also referred to as a dummy subpixel.

The display panel 110 may include a plurality of signal lines for driving a plurality of subpixels SP. For example, the plurality of signal lines may include a plurality of data lines DL and a plurality of gate lines GL. The signal lines may further include other signal lines than the plurality of data lines DL and the plurality of gate lines GL according to the structure of the subpixel SP. For example, the other signal lines may include driving voltage lines and reference voltage lines.

The plurality of data lines DL and the plurality of gate lines GL may cross each other. Each of the plurality of data lines DL may be disposed while extending in a first direction. Each of the plurality of gate lines GL may be disposed while extending in a second direction. Here, the first direction may be a column direction and the second direction may be a row direction. In the disclosure, the column direction and the row direction are relative. For example, the column direction may be a vertical direction and the row direction may be a horizontal direction. As another example, the column direction may be a horizontal direction and the row direction may be a vertical direction.

The driving circuit may include a data driving circuit 130 for driving a plurality of data lines DL and a gate driving circuit 120 for driving a plurality of gate lines GL. The driving circuit may further include a timing controller 140 for controlling the data driving circuit 130 and the gate driving circuit 120.

The data driving circuit 130 is a circuit for driving the plurality of data lines DL, and may output data signals (also referred to as data voltages) corresponding to image signals to the plurality of data lines DL. The gate driving circuit 120 is a circuit for driving the plurality of gate lines GL and may generate gate signals, and output the gate signals to the plurality of gate lines GL. The gate signal may include one or more scan signals and light emission signals.

The timing controller 140 may start a scan according to the timing implemented in each frame and may control data driving at an appropriate time according to the scan. The timing controller 140 may convert input image data or touch image data supplied from the outside to correspond to the data signal format used by the data driving circuit 130 and supply the converted image data DATA to the data driving circuit 130.

The timing controller 140 may receive display driving control signals, along with input image data, from an external host system. For example, the display driving control signals may include a vertical synchronizing signal, a horizontal synchronizing signal, an input data enable signal, and a clock signal.

The timing controller 140 may generate the data driving control signal DCS and the gate driving control signal GCS based on display driving control signals input from the host system. The timing controller 140 may control the driving operation and driving timing of the data driving circuit 130 by supplying the data driving control signal DCS to the data driving circuit 130. The timing controller 140 may control the driving operation and driving timing of the gate driving circuit 120 by supplying the gate driving control signal GCS to the gate driving circuit 120.

The timing controller 140 may supply image data to the data driving circuit 130 in a display period and supply a touch pattern that may be recognized by the stylus 200 to the data driving circuit 130 in a pattern period.

The touch pattern displayed on the display panel 110 in the pattern period may be composed of an encryption pattern divided by area, and the stylus 200 may generate coordinate data by detecting the touch pattern displayed on the display panel 110 in the pattern period.

The data driving circuit 130 may include one or more source driving integrated circuits SDIC. Each source driving integrated circuit may include a shift register, a latch circuit, a digital to analog converter (DAC), an output buffer, and the like. In some cases, each source driving integrated circuit may further include an analog to digital converter (ADC).

For example, each source driving integrated circuit may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 120 may output a gate signal of a turn-on level voltage or a gate signal of a turn-off level voltage according to the control of the timing controller 140. The gate driving circuit 120 may sequentially drive the plurality of gate lines GL by sequentially supplying gate signals of the turn-on level voltage to the plurality of gate lines GL.

The gate driving circuit 120 may include one or more gate driving integrated circuits GDIC.

The gate driving circuit 120 may be connected with the display panel 110 by TAB method or connected to a bonding pad of the display panel 110 by a COG or COP method or may be connected with the display panel 110 according to a COF method. Alternatively, the gate driving circuit 120 may be formed, in a gate in panel (GIP) type, in the bezel area BA of the display panel 110. The gate driving circuit 120 may be disposed on the substrate or may be connected to the substrate. In other words, the gate driving circuit 120 that is of a GIP type may be disposed in the bezel area BA of the substrate. The gate driving circuit 120 that is of a chip-on-glass (COG) type or chip-on-film (COF) type may be connected to the substrate.

Meanwhile, at least one of the data driving circuit 130 and the gate driving circuit 120 may be disposed in the display area DA. For example, at least one of the data driving circuit 130 and the gate driving circuit 120 may be disposed not to overlap the subpixels SP or to overlap all or some of the subpixels SP.

The data driving circuit 130 may be connected to one side (e.g., an upper or lower side) of the display panel 110. Depending on the driving scheme or the panel design scheme, the data driving circuit 130 may be connected with both sides (e.g., upper and lower sides) of the self-emission display panel 110, or two or more of the four sides of the self-emission display panel 110.

The gate driving circuit 120 may be connected with one side (e.g., a left or right side) of the display panel 110. Depending on the driving scheme or the panel design scheme, the gate driving circuit 120 may be connected with both sides (e.g., left and right sides) of the display panel 110, or two or more of the four sides of the display panel 110.

The timing controller 140 may be implemented as a separate component from the data driving circuit 130, or the timing controller 140 and the data driving circuit 130 may be integrated into an integrated circuit (IC). The timing controller 140 may be a controller used in typical display technology or a control device that may perform other control functions as well as the functions of the timing controller, or a circuit in the control device. The timing controller 140 may be implemented as various circuits or electronic components, such as an integrated circuit (IC), a field programmable gate array (FPGA), an application specific integrated circuit (ASIC), or a processor.

The timing controller 140 may be mounted on a printed circuit board or a flexible printed circuit and may be electrically connected with the data driving circuit 130 and the gate driving circuit 120 through the printed circuit board or the flexible printed circuit. The timing controller 140 may transmit/receive signals to/from the data driving circuit 130 according to one or more predetermined interfaces. The interface may include, e.g., a low voltage differential signaling (LVDS) interface, an Embedded Clock Point to Point Interface (EPI), or a serial peripheral interface (SPI).

The touch display device 100 according to embodiments of the disclosure may be a self-emissive display device in which the display panel 110 emits light by itself. When the touch display device 100 according to the embodiments of the disclosure is a self-emissive display device, each of the plurality of subpixels SP may include a light emitting element. For example, the touch display device 100 according to embodiments of the disclosure may be an organic light emitting diode display in which the light emitting element is implemented as an organic light emitting diode (OLED).

As another example, the touch display device 100 according to embodiments of the disclosure may be an inorganic light emitting display device in which the light emitting element is implemented as an inorganic material-based light emitting diode. As another example, the touch display device 100 according to embodiments of the disclosure may be a quantum dot display device in which the light emitting element is implemented as a quantum dot which is self-emission semiconductor crystal.

The timing controller 140 may perform wired/wireless communication with a stylus 200 through the communication circuit 150.

The communication circuit 150 may transmit information about the touch pattern displayed on the display panel 110 in the pattern period to the stylus 200. In addition, the communication circuit 150 may receive coordinate data from the stylus 200 and supply it to the timing controller 140.

The timing controller 140 may generate image data DATA by combining input image data supplied from the host system and the coordinate data supplied from the stylus 200.

The data driving circuit 130 may display the image data DATA including the coordinate data of the stylus 200 through the display panel 110.

Figure 4:
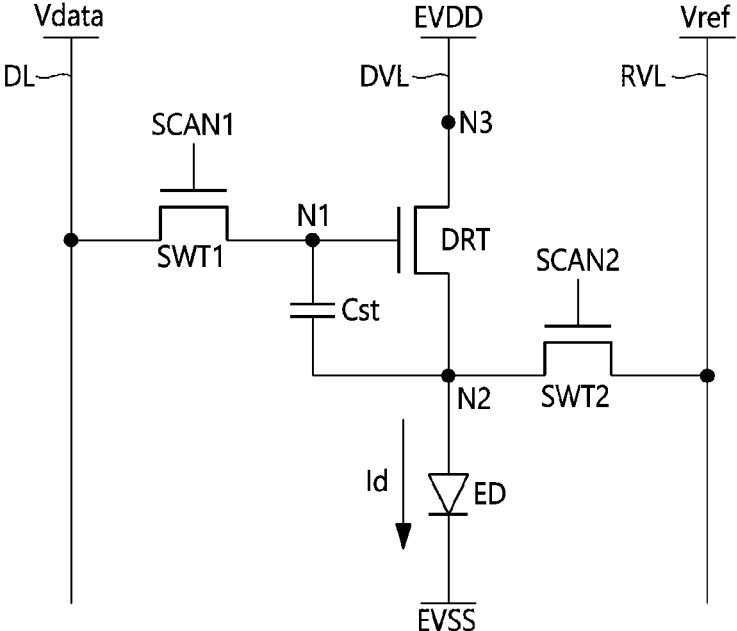
FIG. 4 is a view illustrating an example of a circuit constituting a subpixel in a touch display device according to embodiments of the disclosure.

FIG. 4 is a view illustrating an example of a circuit constituting a subpixel in a touch display device according to embodiments of the disclosure.

Referring to FIG. 4, in the touch display device 100 according to embodiments of the disclosure, the subpixel SP may include one or more transistors and a capacitor and may have a light emitting element disposed therein.

For example, the subpixel SP may include a driving transistor DRT, a first switching transistor SWT1, a second switching transistor SWT2, a storage capacitor Cst, and a light emitting diode ED.

The driving transistor DRT includes the first node N1, second node N2, and third node N3. The first node N1 of the driving transistor DRT may be a gate node to which the data voltage Vdata is applied from the data driving circuit 130 through the data line DL when the first switching transistor SWT1 is turned on.

The second node N2 of the driving transistor DRT may be electrically connected with the anode electrode of the light emitting diode ED and may be the source node or drain node.

The third node N3 of the driving transistor DRT may be electrically connected with the driving voltage line DVL to which the subpixel driving voltage EVDD is applied and may be the drain node or the source node.

In this case, during a display driving period, a subpixel driving voltage EVDD for displaying an image may be supplied to the driving voltage line DVL. For example, the subpixel driving voltage EVDD for displaying an image may be 27V.

The first switching transistor SWT1 is electrically connected between the first node N1 of the driving transistor DRT and the data line DL, and the gate line GL is connected to the gate node. Thus, the first switching transistor SWT1 is operated according to the first scan signal SCAN1 supplied through the gate line GL. When turned on, the first switching transistor SWT1 transfers the data voltage Vdata supplied through the data line DL to the gate node of the driving transistor DRT, thereby controlling the operation of the driving transistor DRT.

The second switching transistor SWT2 is electrically connected between the second node N2 of the driving transistor DRT and the reference voltage line RVL, and the gate line GL is connected to the gate node and is operated according to the second scan signal SCAN2 supplied through the gate line GL. When the second switching transistor SWT2 is turned on, a reference voltage Vref supplied through the reference voltage line RVL is transferred to the second node N2 of the driving transistor DRT.

In other words, as the first switching transistor SWT1 and the second switching transistor SWT2 are controlled, the voltage of the first node N1 and the voltage of the second node N2 of the driving transistor DRT are controlled, so that the current for driving the light emitting diode ED may be supplied.

The gate nodes of the first switching transistor SWT1 and the second switching transistor SWT2 may be commonly connected to one gate line GL or may be connected to different gate lines GL. An example is shown in which the first switching transistor SWT1 and the second switching transistor SWT2 are connected to different gate lines GL in which case the first switching transistor SWT1 and the second switching transistor SWT2 may be independently controlled by the first scan signal SCAN1 and the second scan signal SCAN2 transferred through different gate lines GL.

In contrast, if the first switching transistor SWT1 and the second switching transistor SWT2 are connected to one gate line GL, the first switching transistor SWT1 and the second switching transistor SWT2 may be simultaneously controlled by the first scan signal SCAN1 or second scan signal SCAN2 transferred through the same gate line GL, and the aperture ratio of the subpixel SP may be increased.

The transistor disposed in the subpixel SP may be an n-type transistor or a p-type transistor and, in the shown example, the transistor is an n-type transistor.

The storage capacitor Cst is electrically connected between the first node N1 and second node N2 of the driving transistor DRT and maintains the data voltage Vdata during one frame.

The storage capacitor Cst may also be connected between the first node N1 and third node N3 of the driving transistor DRT depending on the type of the driving transistor DRT. The anode electrode of the light emitting diode ED may be electrically connected with the second node N2 of the driving transistor DRT, and a base voltage EVSS may be applied to the cathode electrode of the light emitting diode ED.

The base voltage EVSS may be a ground voltage or a voltage higher or lower than the ground voltage. The base voltage EVSS may be varied depending on the driving state. For example, the base voltage EVSS at the time of display driving and the base voltage EVSS at the time of sensing driving may be set to differ from each other.

The first switching transistor SWT1 and the second switching transistor SWT2 may be referred to as scan transistors controlled through scan signals SCAN1 and SCAN2.

The structure of the subpixel SP may further include one or more transistors or, in some cases, further include one or more capacitors.

The touch display device 100 of the disclosure may emit a touch pattern through the display panel 110 in the pattern period, so that the stylus 200 may detect the touch pattern and generate coordinate data.

Figure 5:
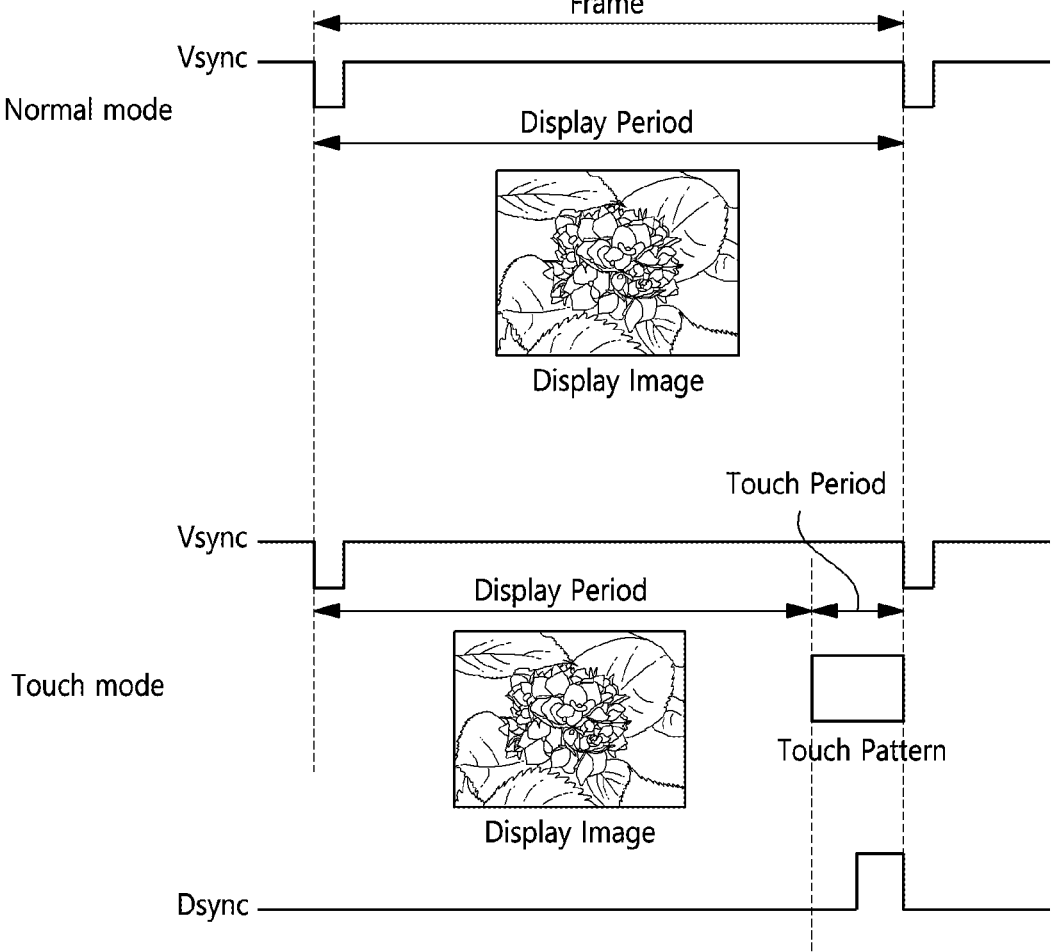
FIG. 5 is a conceptual diagram illustrating a touch driving method according to embodiments of the disclosure.

FIG. 5 is a conceptual diagram illustrating a touch driving method according to embodiments of the disclosure.

Referring to FIG. 5, the touch display device 100 according to embodiments of the disclosure may operate in normal mode and touch mode.

In normal mode, a 1 frame period divided by a vertical synchronization signal Vsync corresponds to the display period, and image is displayed on the display panel 110 during the display period.

On the other hand, in touch mode, 1 frame period is divided into a display period and a touch period. In touch mode, image is displayed on the display panel 110 in the display period, and a touch pattern is displayed on the display panel 110 in the touch period.

The touch display device 100 may operate in normal mode while contact with the stylus 200 is not detected, and may operate in touch mode while contact with the stylus 200 is detected.

The stylus 200 may detect the contact/approach of the touch display device 100 through the touch sensor 220. Also, the touch display device 200 may switch between the normal mode and the touch mode using data transmitted from the stylus 200 through the communication circuit 150.

Alternatively, when touch electrodes are disposed on the touch display device 100, it may switch between the normal mode and the touch mode using a touch sensing signal detected through the touch electrodes.

At this time, when a touch pattern is displayed on the display panel 110 during the touch period, the stylus 200 may generate coordinate data by detecting the touch pattern displayed on the display panel 110 using a detection synchronizing signal Dsync.

The timing controller 140 of the touch display device 100 may divide frame periods through a vertical synchronization signal Vsync and supply a detection synchronizing signal Dsync to the stylus 200 through the communication circuit 150. As a result, the stylus 200 may detect a touch pattern during the touch period.

The detection synchronizing signal Dsync may be generated after some time for displaying the touch pattern on the display panel 110 during the touch period.

The display period may include a time interval that allows the user to recognize the image through the display panel 110. Also, the touch period may include a time interval that allows the stylus 200 to detect the touch pattern.

For example, the display period in normal mode may correspond to 1 frame period. Meanwhile, in touch mode, the display period may have a time interval of 70 to 90% of 1 frame period, and the touch period may have a time interval of 10 to 30% of 1 frame period.

Figure 6:
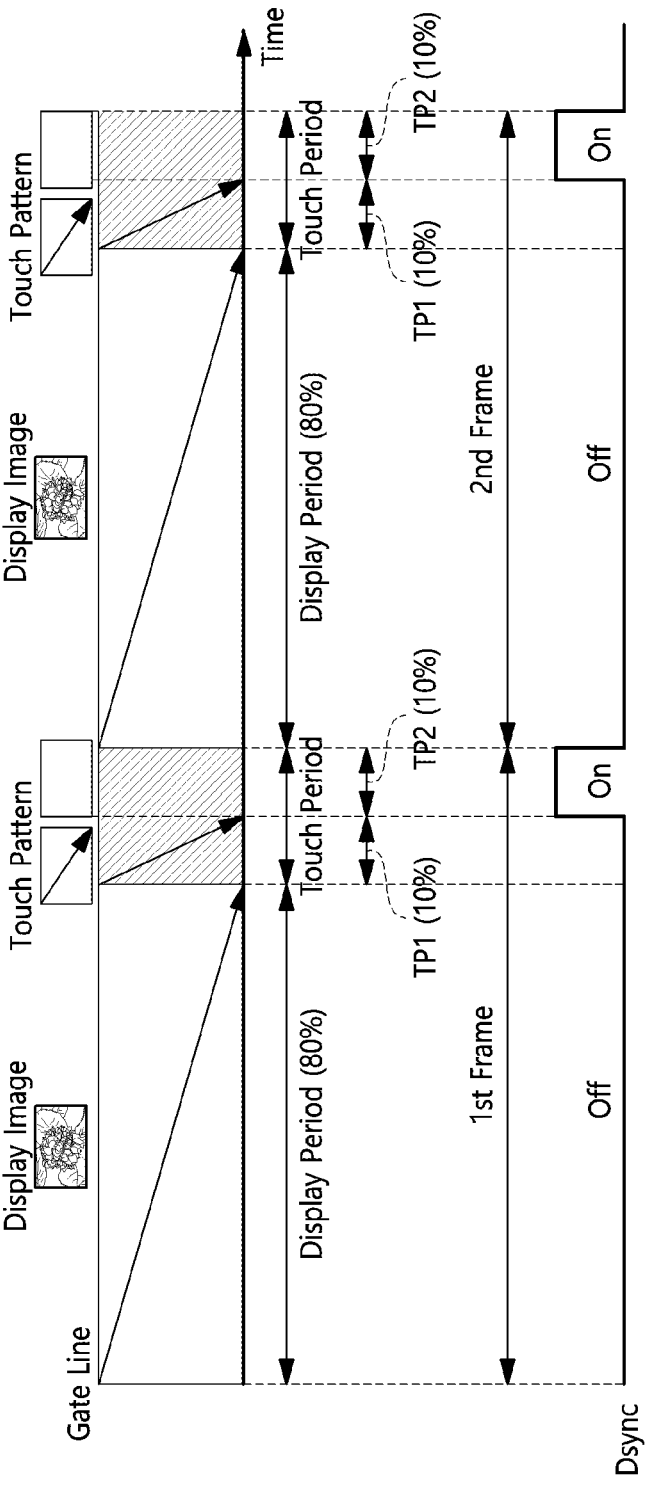
FIG. 6 is a diagram illustrating an operation process of a touch mode in a touch driving method according to embodiments of the disclosure.

FIG. 6 is a diagram illustrating an operation process of a touch mode in a touch driving method according to embodiments of the disclosure.

Referring to FIG. 6, the touch driving method according to embodiments of the disclosure may divide 1 frame period into a display period and a touch period in the touch mode.

In touch mode, the display period is a period in which image is displayed through the display panel 110. The display period may correspond to a front 80% of 1 frame period.

During the display period, scan signals are sequentially supplied through N gate lines, and each subpixel emits light with a data voltage corresponding to the image, thereby displaying the image.

The touch period is a period in which a touch pattern is displayed through the display panel 110. The touch period may correspond to last 20% of 1 frame period.

During the touch period, scan signals are sequentially supplied through N gate lines, and each subpixel emits light with a voltage corresponding to the touch pattern, thereby displaying the touch pattern.

When the display period is 80% of 1 frame period and the touch period is 20% of 1 frame period, it may be said that the duty ratio of the touch period in 1 frame period is 20%.

The touch period may include a pattern displaying period TP1 in which touch patterns are sequentially displayed on the display panel 110 and a pattern detecting period TP2 in which the stylus 200 detects the touch pattern displayed through the display panel 110.

The detection synchronizing signal Dsync maintains a turn-off level during the display period and the pattern displaying period TP1, and is transmitted at a turn-on level during the pattern detecting period TP2. Accordingly, the stylus 200 may detect the touch pattern displayed on the display panel 110 according to the detection synchronizing signal Dsync of the turn-on level.

When the touch period is the last 20% of the 1 frame period, the pattern displaying period TP1 and the pattern detecting period TP2 may be 10% of the 1 frame period, respectively.

Meanwhile, for the touch driving method according to embodiments of the disclosure, a time interval of the display period in normal mode may be different from a time interval of the display period in touch mode. Therefore, the width of the scan signals for driving the same display panel 110 may be vary depending on the mode.

Figure 7:
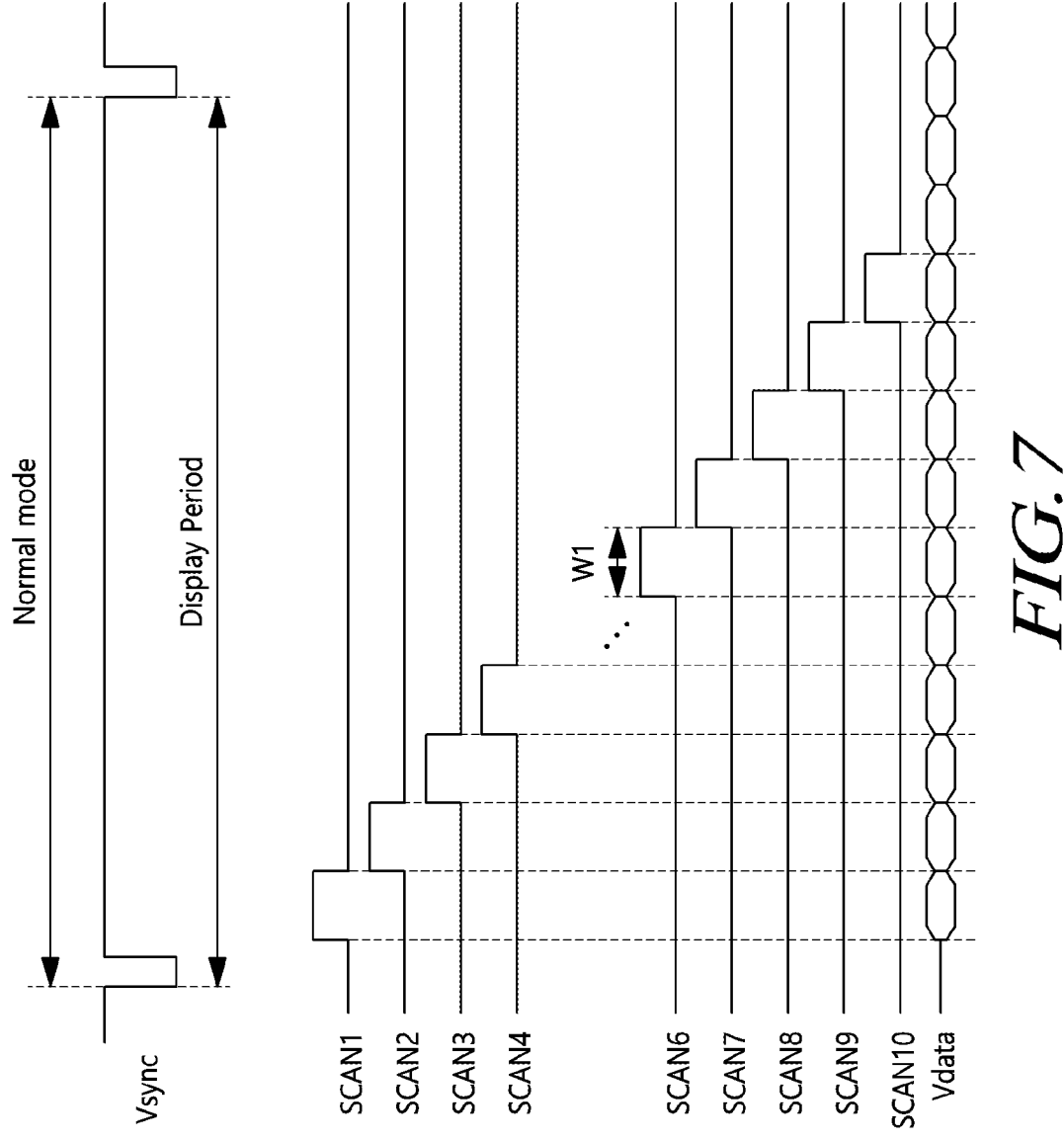
FIG. 7 is a signal flow illustrating scan signals in normal mode in a touch driving method according to embodiments of the disclosure.
Figure 8:
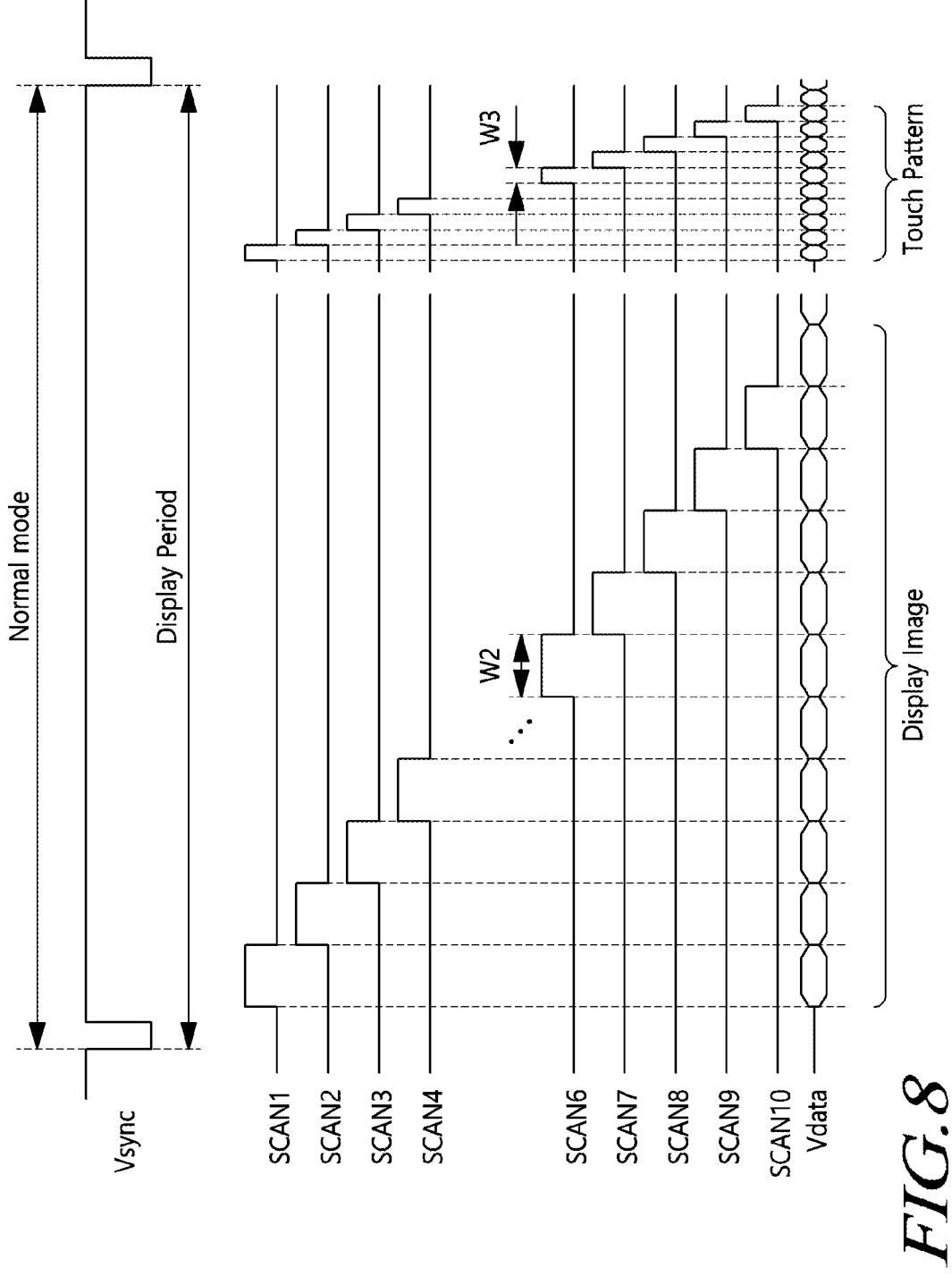
FIG. 8 is a signal flow illustrating scan signals in touch mode in a touch driving method according to embodiments of the disclosure.

FIG. 7 is a signal flow illustrating scan signals in normal mode in a touch driving method according to embodiments of the disclosure, and FIG. 8 is a signal flow illustrating scan signals in touch mode in a touch driving method according to embodiments of the disclosure.

Referring to FIG. 7, 1 frame period in normal mode corresponds to a display period that displays an image.

Therefore, scan signals are sequentially supplied through the gate lines during the display period, and the data voltages Vdata corresponding to the image are sequentially supplied through the data lines at the time the subpixels are turned on by each scan signal.

For example, when the display period has a time interval of 16.7 ms and a total of 10 scan signals SCAN1-SCAN10 are supplied sequentially, 1 scan signal may have a signal width W1 of 1.67 ms.

Meanwhile, referring to FIG. 8, 1 frame period in touch mode includes a display period and a touch period.

At this time, since the display period in touch mode is shorter than the display period in normal mode, the width W2 of the second scan signal supplied in the display period in touch mode becomes shorter than the width W1 of the first second scan signal supplied in the display period in normal mode.

Since the touch period in touch mode is a period in which the touch pattern is displayed, it is shorter than the display period. In addition, the width W3 of a third scan signal supplied in the touch period becomes shorter than the width W2 of the second scan signal supplied in the display period in touch mode.

At this time, when the width of the scan signal changes, the luminance of the image displayed through the display panel 110 may change. Accordingly, the touch display device 100 of the disclosure may reduce the luminance deviation by controlling the level of the driving current flowing through the light emitting element of the subpixel based on the width of the scan signal that varies depending on the mode change.

Figures 9A, 9B:
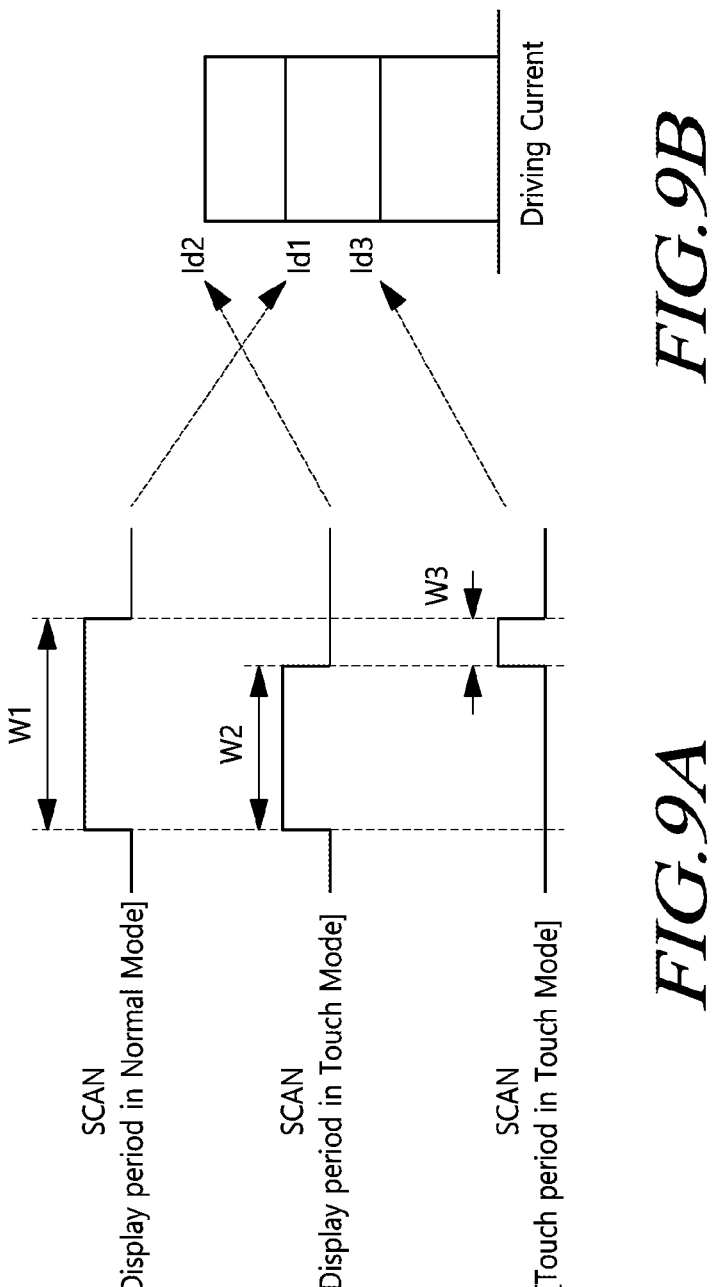
FIGS. 9A and 9B are diagrams illustrating a change in driving current according to the width of the scan signal in the touch driving method according to embodiments of the disclosure.

FIGS. 9A and 9B are diagrams illustrating a change in driving current according to the width of the scan signal in the touch driving method according to embodiments of the disclosure.

Referring to FIGS. 9A and 9B, the width of the scan signal in normal mode may be different from the width of the scan signal in touch mode in the touch driving method according to embodiments of the disclosure.

Since 1 frame period in normal mode corresponds to a display period that displays an image, the width W1 of the first scan signal supplied to the display panel 110 in normal mode may be the widest width.

On the other hand, 1 frame period in touch mode may be divided into a display period and a touch period. Therefore, the display period in touch mode becomes shorter than the display period in normal mode, and the width W2 of the second scan signal supplied in the display period in touch mode becomes shorter than the width W1 of the first scan signal supplied in the display period in normal mode.

In addition, the touch period in touch mode becomes shorter than the display period, and the width W3 of the third scan signal supplied in the touch period in touch mode becomes shorter than the width W2 of the second scan signal supplied in the display period in touch mode.

At this time, since the display period in touch mode is shorter than the display period in normal mode, a luminance deviation may occur between the images displayed through the display panel 110 in touch mode and normal mode. The luminance deviation may be reduced by controlling the level of the driving current Id flowing through the light emitting element of the subpixel based on the width of the scan signal that varies depending on the mode considering this luminance deviation.

When the first driving current Id1 flows to the light emitting element due to the width W1 of the first scan signal supplied to the display panel 110 in normal mode, the width W2 of the second scan signal supplied in the display period in touch mode becomes shorter than the width WW1 of the first scan signal. Therefore, the second driving current Id2 is controlled with a higher level than the first driving current Id1 to flow in the display period in touch mode.

For example, when considering the width W1 of the first scan signal as 100%, if the width W2 of the second scan signal is 80%, the level of the second driving current Id2 may be determined to be 120% or more of the level of the first driving current Id1. For the above, the level of the data voltage Vdata corresponding to the same gray level may be controlled depending on the mode. Alternatively, the level of the subpixel driving voltage EVDD supplied to the display panel 110 may be controlled depending on the mode. Alternatively, for the same image data, the data voltage Vdata generated from the data driving circuit 130 in touch mode may be amplified by a predetermined ratio than the data voltage Vdata generated from the data driving circuit 130 in normal mode.

Meanwhile, since the touch pattern displayed through the display panel 110 in the touch period in the touch mode may have a luminance level that can be recognized by the light sensor 210 of the stylus 200, the touch pattern may be displayed in a single color with low luminance.

In this case, the third driving current Id3 flowing through the light emitting element of the subpixel in the touch period in touch mode may have a lower level than the first driving current Id1.

Figures 10A, 10B:
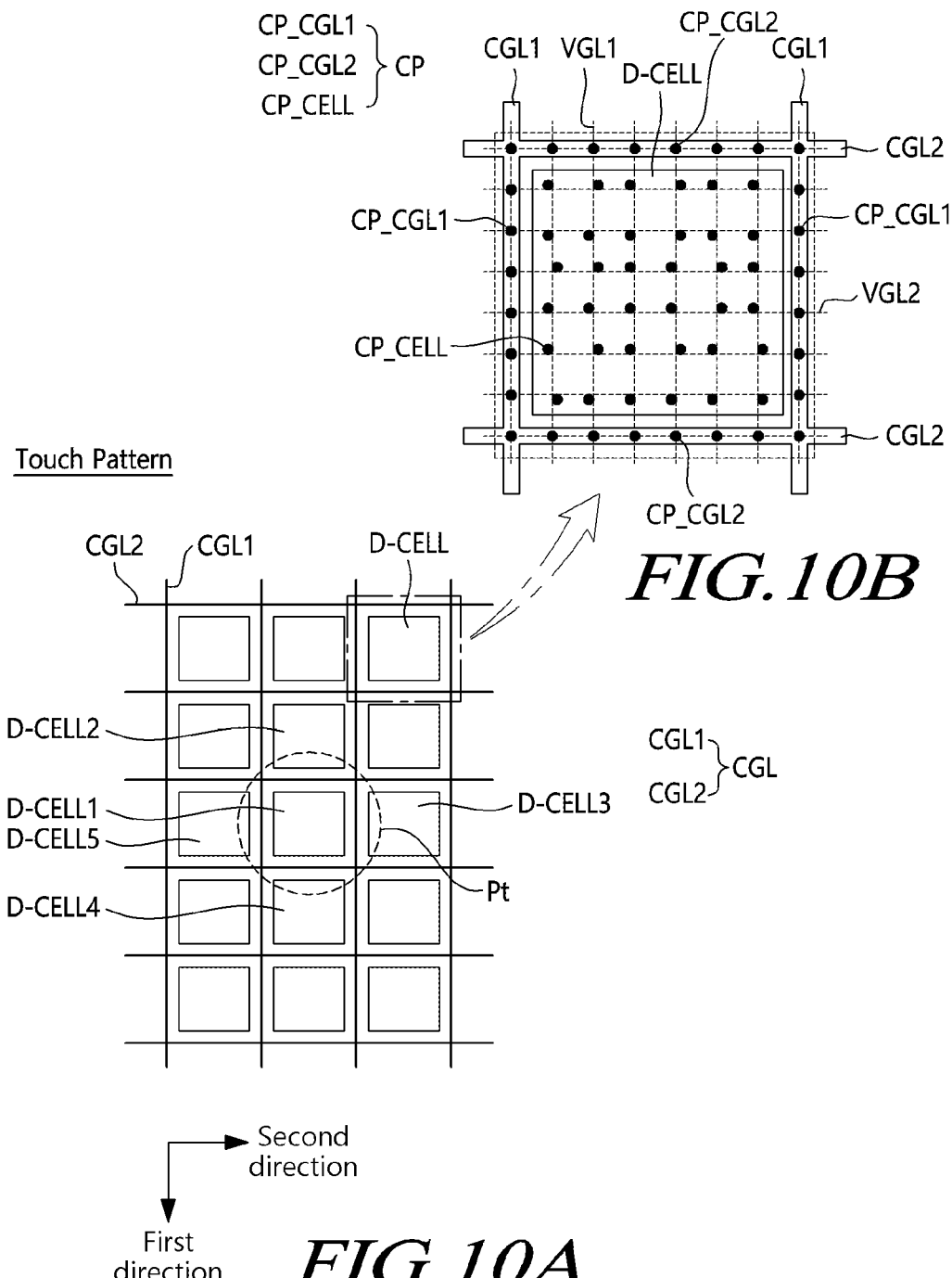
FIGS. 10A and 10B are diagrams illustrating a touch pattern displayed in a touch display device according to embodiments of the disclosure.

FIGS. 10A and 10B are diagrams illustrating a touch pattern displayed in a touch display device according to embodiments of the disclosure.

Referring to FIGS. 10A and 10B, the touch pattern in the touch display device 100 according to embodiments of the disclosure may include a cell area D-CELL positioned between adjacent guide lines CGL.

For example, the touch pattern may include a plurality of cell areas D-CELL arranged in rows and columns, a plurality of first guide lines CGL1 disposed between adjacent cell areas D-CELL in a second direction, and a plurality of second guide lines CGL2 disposed between adjacent cell areas D-CELL in a first direction.

Each of the plurality of first guide lines CGL1 may extend in the first direction, and each of the plurality of second guide lines CGL2 may extend in the second direction.

The touch pattern may include a plurality of first guide patterns CP_CGL1 for indicating the plurality of first guide lines CGL1, respectively, a plurality of second guide patterns CP_CGL2 for indicating the plurality of second guide lines CGL2, respectively, and a plurality of cell patterns CP_CELL disposed in the plurality of cell areas D-CELL, respectively, and arranged in rows and columns.

The arrangement shape of the plurality of cell patterns CP_CELL may be different for each of the plurality of cell areas D-CELL.

The plurality of cell patterns CP_CELL included in each of the plurality of cell areas D-CELL may be arranged in a matrix form of m rows and n columns.

In each of the plurality of cell areas D-CELL, the plurality of cell patterns CP_CELL may be arranged along virtual grid lines VGL1 and VGL2 of m rows and n columns.

Each of the plurality of cell areas D-CELL may correspond to one coordinate data. The overall arrangement position of the plurality of cell patterns CP_CELL included in each of the plurality of cell areas D-CELL may represent one coordinate data. Accordingly, the plurality of cell patterns CP_CELL may be arranged in m rows and n columns for each of the plurality of cell areas D-CELL, and the arrangement positions may be slightly different.

The plurality of cell patterns CP_CELL included in each of the plurality of cell areas D-CELL may have a unique array shape (also referred to as a unique array position pattern) corresponding to unique coordinates.

The unique array position pattern of the plurality of cell patterns CP_CELL included in each of the plurality of cell areas D-CELL may be an encryption pattern representing one unique coordinate.

For example, each of the plurality of cell areas D-CELL may include 36 cell patterns CP_CELL arranged in six rows and six columns and arranged in a unique pattern to represent (code) unique coordinates.

The first cell area D-CELL1 may include 36 cell patterns CP_CELL to represent the first coordinates. The second cell area D-CELL2 may include 36 cell patterns CP_CELL to represent the second coordinates. The third cell area D-CELL3 may include 36 cell patterns CP_CELL to represent the third coordinates. The fourth cell area D-CELL4 may include 36 cell patterns CP_CELL to represent the fourth coordinates. The fifth cell area D-CELL5 may include 36 cell patterns CP_CELL to represent fifth coordinates.

The array position of the 36 cell patterns CP_CELL included in the first cell area D-CELL1 may be a first encryption pattern indicating the first coordinates, the array position of the 36 cell patterns CP_CELL included in the second cell area D-CELL2 may be a second encryption pattern indicating the second coordinates, the array position of the 36 cell patterns CP_CELL included in the third cell area D-CELL3 may be a third encryption pattern indicating the third coordinates, the array position of the 36 cell patterns CP_CELL included in the fourth cell area D-CELL4 may be a fourth encryption pattern indicating the fourth coordinates, and the array position of the 36 cell patterns CP_CELL included in the fifth cell area D-CELL5 may be an encryption pattern indicating the fifth coordinates.

In other words, the first coordinates corresponding to the first cell area D-CELL1, the second coordinates corresponding to the second cell area D-CELL2, the third coordinates corresponding to the third cell area D-CELL3, the fourth coordinates corresponding to the fourth cell area D-CELL4, and the fifth coordinates corresponding to the fifth cell area D-CELL5 are all different. Accordingly, the array position of the 36 cell patterns CP_CELL included in the first cell area D-CELL1, the array position of the 36 cell patterns CP_CELL included in the second cell area D-CELL2, the array position of the 36 cell patterns CP_CELL included in the third cell area D-CELL3, the array position of the 36 cell patterns CP_CELL included in the fourth cell area D-CELL4, and the array position of the 36 cell patterns CP_CELL included in the fifth cell area D-CELL5 may all be different from each other.

Each of the plurality of cell areas D-CELL may correspond to a partial area of the display area DA. Each cell area D-CELL may overlap a group of two or more subpixels among a plurality of subpixels included in the display area DA. For example, the first cell area D-CELL1 may overlap a first group including two or more first subpixels, and the second cell area D-CELL2 may overlap a second group including two or more second subpixels. Two or more first subpixels included in the first group and two or more second subpixels included in the second group may be different from each other.

The stylus 200 may recognize the touch pattern displayed in the touch display device 100, may recognize the plurality of first guide lines CGL1 and the plurality of second guide lines CGL2 based on the recognition result, and may recognize the plurality of cell areas D-CELL partitioned by the plurality of first guide lines CGL1 and the plurality of second guide lines CGL2.

The stylus 200 may recognize the array position of the plurality of cell patterns CP_CELL included in at least one of the plurality of cell areas D-CELL, and may determine the position (touch position) of the stylus 200 based on the recognition result.

For example, when the stylus 200 touches the position Pt centered on the first cell area D-CELL1, the stylus 200 may recognize the array position of the plurality of cell patterns CP_CELL included in each of the first to fifth cell areas D-CELL1 to D-CELL5 based on the sensing result of the reflected light having a difference in shade or wavelength, and may calculate a more precise touch position based on the difference in signal intensity between the reflected light and the first to fifth coordinates corresponding to the first to fifth cell areas D-CELL1 to D-CELL5.

Figure 11:
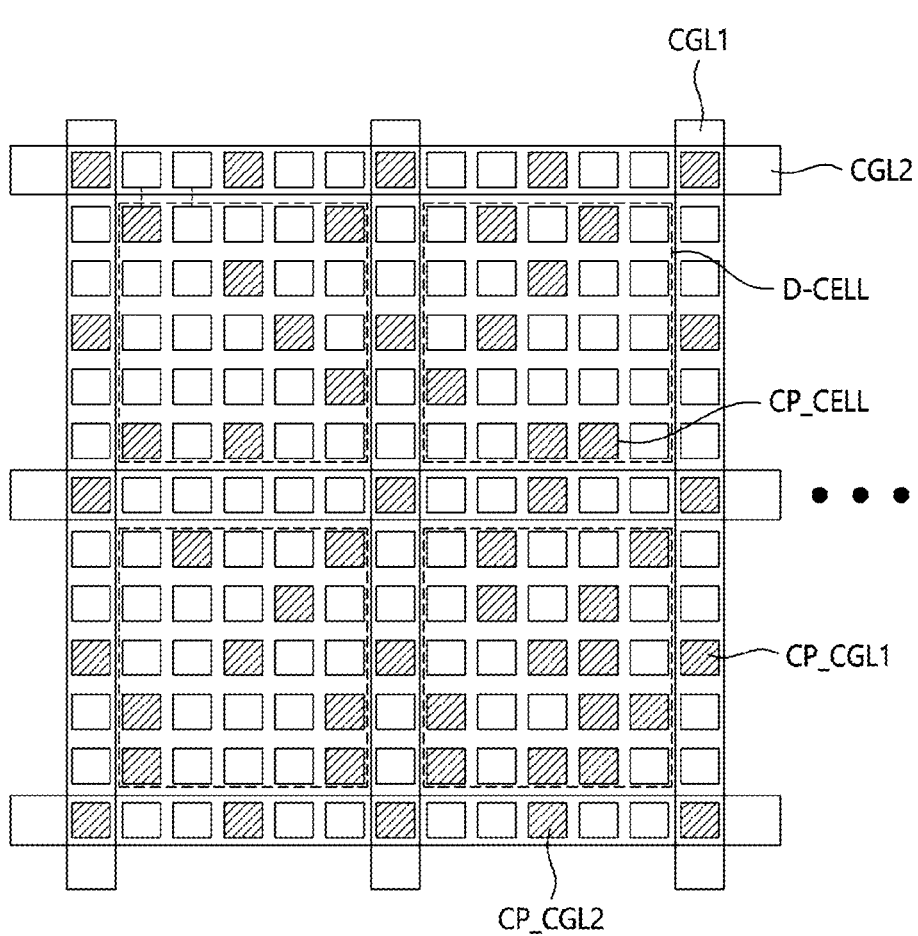
FIG. 11 is a diagram illustrating a touch pattern displayed in a touch period in the touch driving method according to embodiments of the disclosure.

FIG. 11 is a diagram illustrating a touch pattern displayed in a touch period in the touch driving method according to embodiments of the disclosure.

Referring to FIG. 11, the touch pattern displayed in the touch period depending on the touch driving method according to embodiments of the disclosure may be an encryption pattern in which subpixels at specific positions among a plurality of subpixels formed on the display panel 110 emit light.

The touch pattern may include a guide line CGL for distinguishing the cell area D-CELL and the cell area D-CELL in which the encryption pattern is positioned.

The guide line CGL may include guide patterns CP_CGL1 and CP_CGL2 arranged at regular intervals to distinguish the cell areas D-CELL. For example, the guide line CGL may be formed so that one first guide pattern CP_CGL1 and the second guide pattern CP_CGL2 are arranged at an interval of two subpixels.

The inner space of the guide line CGL corresponds to the cell area D-CELL in which the encryption pattern is positioned. The cell area D-CELL may include a plurality of subpixels.

The cell area D-CELL may include different cell patterns CP_CELL for each area divided by the first guide line CGL1 and the second guide line CGL2.

The cell pattern CP_CELL positioned in the cell area D-CELL may correspond to a pattern value determined according to the emitted position. For example, the cell pattern may correspond to a designated pattern value depending on the direction in which the encryption pattern is displayed among the upper, lower, left, and right directions from the intersection of the virtual grating lines in the cell area D-CELL.

In this case, each pattern value may be converted into a first bit value of the X coordinate and a second bit value of the Y coordinate. By combining the corresponding information as described above, coordinates on the surface of the display panel 110 where the touch pattern is formed may be determined.

Here, 5×5 encryption patterns are disposed in the cell area D-CELL consisting of horizontal and vertical areas having a predetermined length, so that it may be formed to have different cell patterns CP_CELL no matter which direction the pattern distribution is detected in.

The unit gratings formed by these 25 patterns may represent different position coordinates on the surface of the display panel 110.

For example, when the cell area D-CELL is formed with 5×5 encryption patterns on the display panel 110 having a UHD resolution (3840×2160), $2^{25}$ pieces of information may be recorded through the cell area D-CELL, and up to 230,400 cell areas 334 may be formed.

Accordingly, the stylus 200 may detect a pattern value corresponding to the touch pattern by detecting the touch patter emitted on the display panel 110 by using the optical sensor 210.

Meanwhile, when the touch driving method of the disclosure operates in touch mode, touch periods may be included in each frame, but touch periods may also be included at regular frame intervals.

Figure 12:
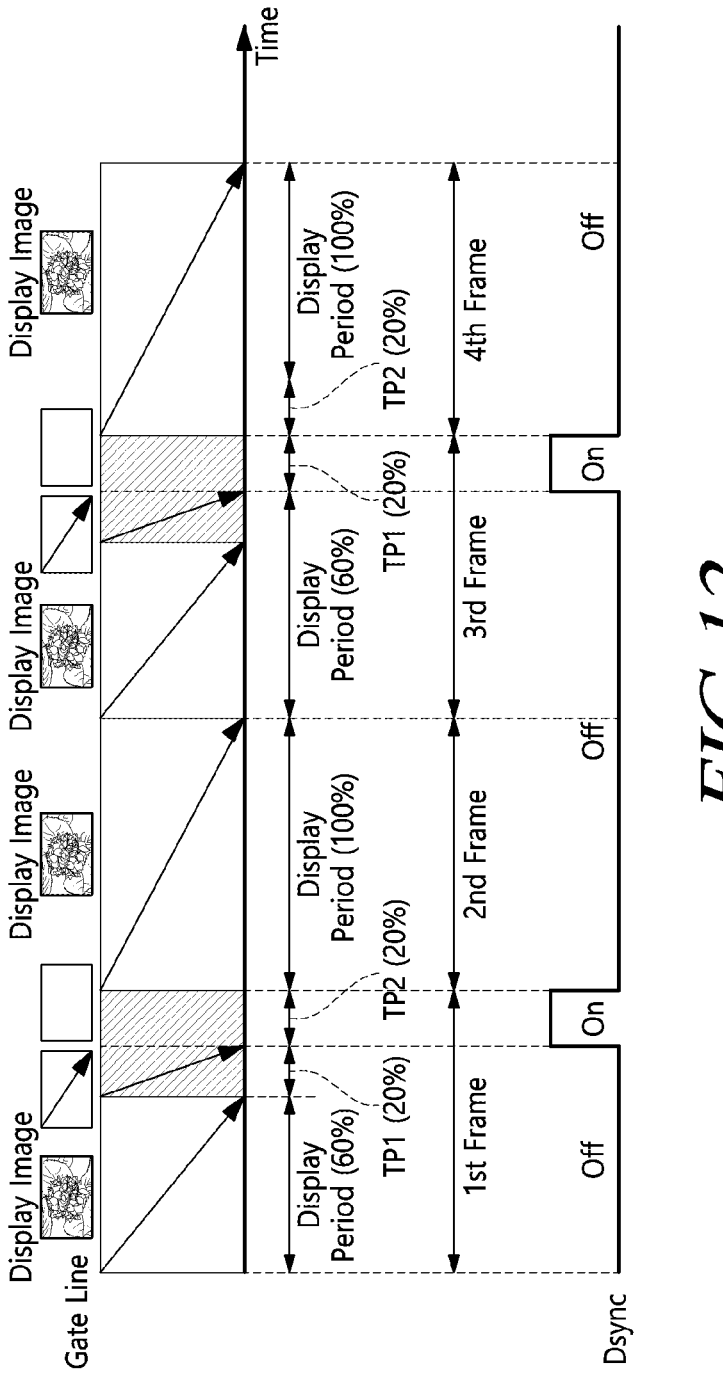
FIG. 12 is a diagram illustrating an operation when touch periods are included in every two frames in a touch driving method according to another embodiment of the disclosure.

FIG. 12 is a diagram illustrating an operation when touch periods are included in every two frames in a touch driving method according to another embodiment of the disclosure.

Referring to FIG. 12, the touch driving method according to another embodiment of the disclosure may include touch periods in every two frames in touch mode.

For example, the first frame period may include a display period and a touch period, and the second frame period may include only a display period. In addition, the third frame period may include a display period and a touch period, and the fourth frame period may include only a display period.

The display period is a period in which images are displayed through the display panel 110. During the display period, scan signals are sequentially supplied through N gate lines, and each subpixel emits light with a data voltage corresponding to the image, thereby displaying the image.

In the first frame period, the display period may be the first 60% of the first frame period, and the touch period may be the last 40% of the first frame period.

The touch period is a period in which a touch pattern is displayed through the display panel 110. During the touch period, scan signals are sequentially supplied through N gate lines, and each subpixel emits light with a voltage corresponding to the touch pattern, thereby displaying the touch pattern.

The touch period may include a pattern displaying period TP1 in which the touch patterns are sequentially displayed on the display panel 110 and a pattern detecting period TP2 in which the stylus 200 detects the touch pattern displayed through the display panel 110.

The detection synchronizing signal Dsync maintains a turn-off level during the display period and the pattern displaying period TP1. The detection synchronizing signal Dsync is transmitted at a turn-on level during the pattern detecting period TP2. Accordingly, the stylus 200 may detect the touch pattern displayed on the display panel 110 according to the detection synchronizing signal Dsync at the turn-on level.

When the touch period is the last 40% of the first frame period, the pattern displaying period TP1 and the pattern detecting period TP2 may be 20% of the first frame period.

Meanwhile, the second frame period may include only a display period. Therefore, the display period is 100% of the second frame period, and only the image is displayed during the second frame period.

The third frame period may be the same as the first frame period. The display period may be the first 60% of the third frame period, and the touch period may be last 40% of the third frame period.

The fourth frame period may include only the display period like the second frame period.

In this way, when the display period is 60% and the touch period is 40% of a frame period in the odd frame period, and the display period is 100% of a frame period in the even frame period, a duty ratio of the touch period in the entire frame period may be said to be 20%.

As such, the touch driving method of the disclosure may include a touch period in every frame period or may include a touch period at regular frame intervals.

A case where a touch period is included in every frame period may be referred to as a first touch mode, and a case where a touch period is included at regular frame intervals may be referred to as a second touch mode.

The touch driving method of the disclosure may operate in the first touch mode or the second touch mode, or the first touch mode and the second touch mode may operate alternately. When the first touch mode and the second touch mode operate alternately, according to some embodiments, the duty ratio of the touch period in touch mode is maintained constant.

Figure 13:
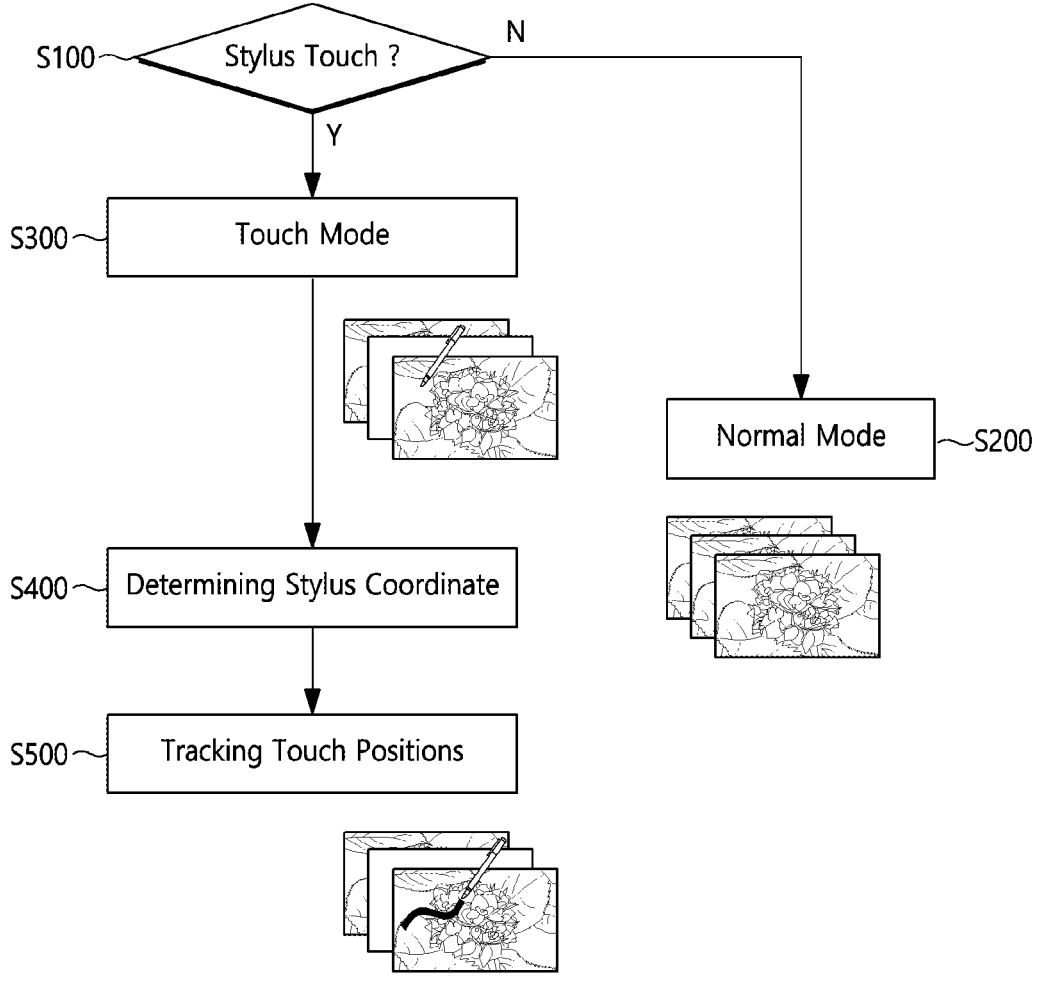
FIG. 13 is a diagram illustrating a flowchart of a touch driving method according to embodiments of the disclosure.

FIG. 13 is a diagram illustrating a flowchart of a touch driving method according to embodiments of the disclosure.

Referring to FIG. 13, the touch driving method according to embodiments of the disclosure may include a step S100 of determining whether a stylus is touched, a step S200 of operating in normal mode when there is no touch by the stylus, a step S300 of operating in touch mode when there is a touch by the stylus, a step S400 of determining coordinates of the stylus in touch mode, and a step S500 of tracking touch positions.

The step S100 of determining whether a stylus 200 is touched is a process in which the touch display device 100 determines the contact state of the stylus 200. The touch display device 100 may determine the touch of the stylus 200 by receiving pressure information detected by the touch sensor 220 of the stylus 200, and may determine the touch of the stylus 200 by the touch electrodes disposed on the display panel 110.

The step S200 of operating in normal mode when there is no touch by the stylus 200 is a process of displaying an image through the display panel 110 in a state where the stylus 200 is not in contact with or close to the display panel 110.

The step S300 of operating in touch mode when there is a touch by the stylus 200 is a process of displaying a touch pattern by dividing a specific frame period into a display period and a touch period when the touch of the stylus 200 is detected.

The touch mode may include a first touch mode in which a touch period is included in every frame period, or a second touch mode in which a touch period is included in frame periods at regular interval. The touch display device 100 may operate in the first touch mode or the second touch mode, or may operate in the first touch mode and the second touch mode alternately.

The step S400 of determining coordinates of the stylus 200 in touch mode is a process of determining the touch coordinates of the stylus 200 by detecting the touch pattern. The touch coordinates may be calculated by the stylus 200 to be transmitted to the touch display device 100, or may be calculated by the touch display device 100 using data of the touch pattern transmitted from the stylus 200.

The step S500 of tracking touch positions is a process of continuously detecting the coordinate data of the stylus 200 and displaying the touch position of the stylus 200 on the display panel 110.

Meanwhile, the touch driving method of the disclosure may increase efficiency for touch detection and image display by displaying a touch pattern only on the local area adjacent to the touch coordinates after detecting the touch coordinates of the stylus 200.

Figure 14:
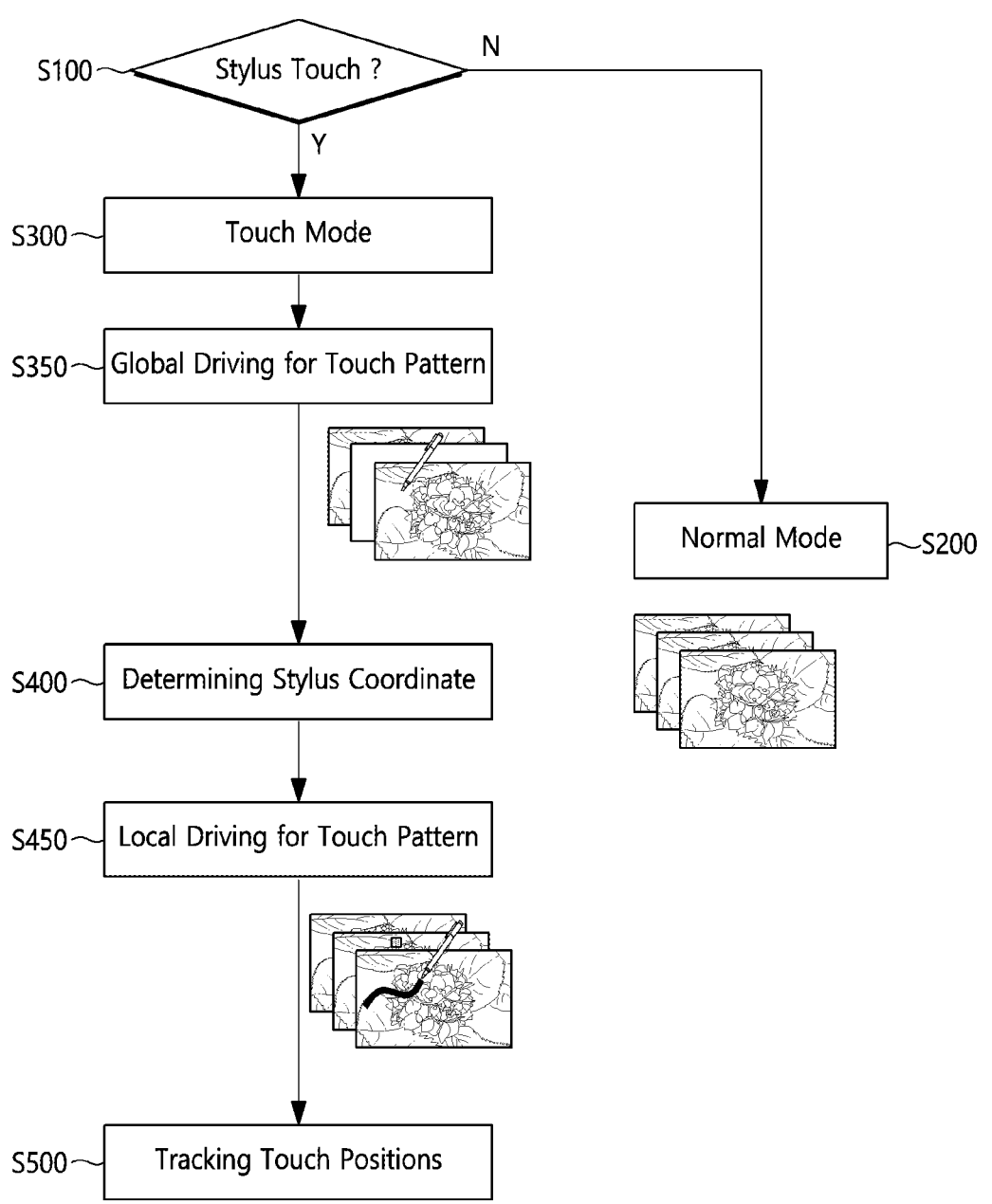
FIG. 14 is a diagram illustrating a flowchart of a touch driving method according to another embodiment of the disclosure.

FIG. 14 is a diagram illustrating a flowchart of a touch driving method according to another embodiment of the disclosure.

Referring to FIG. 14, the touch driving method according to embodiments of the disclosure may include a step S100 of determining whether a stylus 200 is touched, a step S200 of operating in normal mode when there is no touch by the stylus 200, a step S300 of operating in touch mode when there is a touch by the stylus 200, a step S350 of global operation displaying touch pattern on an entire display panel in touch mode, a step S400 of determining coordinates of the stylus 200, a step S450 of local operation display touch pattern on a local area of the display panel based on a coordinate of the stylus 200, and a step S500 of tracking touch positions.

The step S100 of determining whether a stylus 200 is touched is a process in which the touch display device 100 determines the contact state of the stylus 200. The touch display device 100 may determine the touch of the stylus 200 by receiving pressure information detected by the touch sensor 220 of the stylus 200, and may determine the touch of the stylus 200 by the touch electrodes disposed on the display panel 110.

The step S200 of operating in normal mode when there is no touch by the stylus 200 is a process of displaying an image through the display panel 110 in a state where the stylus 200 is not in contact with or close to the display panel 110.

The step S300 of operating in touch mode when there is a touch by the stylus 200 is a process of displaying a touch pattern by dividing a specific frame period into a display period and a touch period when the touch of the stylus 200 is detected.

The touch mode may include a first touch mode in which a touch period is included in every frame period, or a second touch mode in which a touch period is included in frame periods at regular interval. The touch display device 100 may operate in the first touch mode or the second touch mode, or may operate in the first touch mode and the second touch mode alternately.

The step S350 of global operation displaying touch pattern on an entire display panel in touch mode is a process of displaying touch pattern on the entire area of the display panel 110 and detecting touch coordinates of the stylus 200.

An initial position of the stylus 200 may be detected based on the entire area of the display panel 110 through the step of global operation.

The step S400 of determining coordinates of the stylus 200 is a process of determining the touch coordinates of the stylus 200 by detecting the touch pattern. The touch coordinates may be calculated by the stylus 200 to be transmitted to the touch display device 100, or may be calculated by the touch display device 100 using data of the touch pattern transmitted from the stylus 200.

The step of local operation S450 of displaying a touch pattern on a local area based on the coordinates of the stylus 200 displays a touch pattern in the touch period only on the local area adjacent to the initial position of the stylus 200. At this time, a remaining area except for the local area where the touch pattern is displayed may display an image.

That is, in the local driving process, the touch pattern is displayed only on the local area where the stylus 200 is detected and the image is displayed on the remaining area of the display panel 110. Therefore, the user's visibility of the image may be improved.

The step S500 of tracking touch positions is a process of continuously detecting the coordinate data of the stylus 200 and displaying the touch position of the stylus 200 on the display panel 110.

Figure 15:
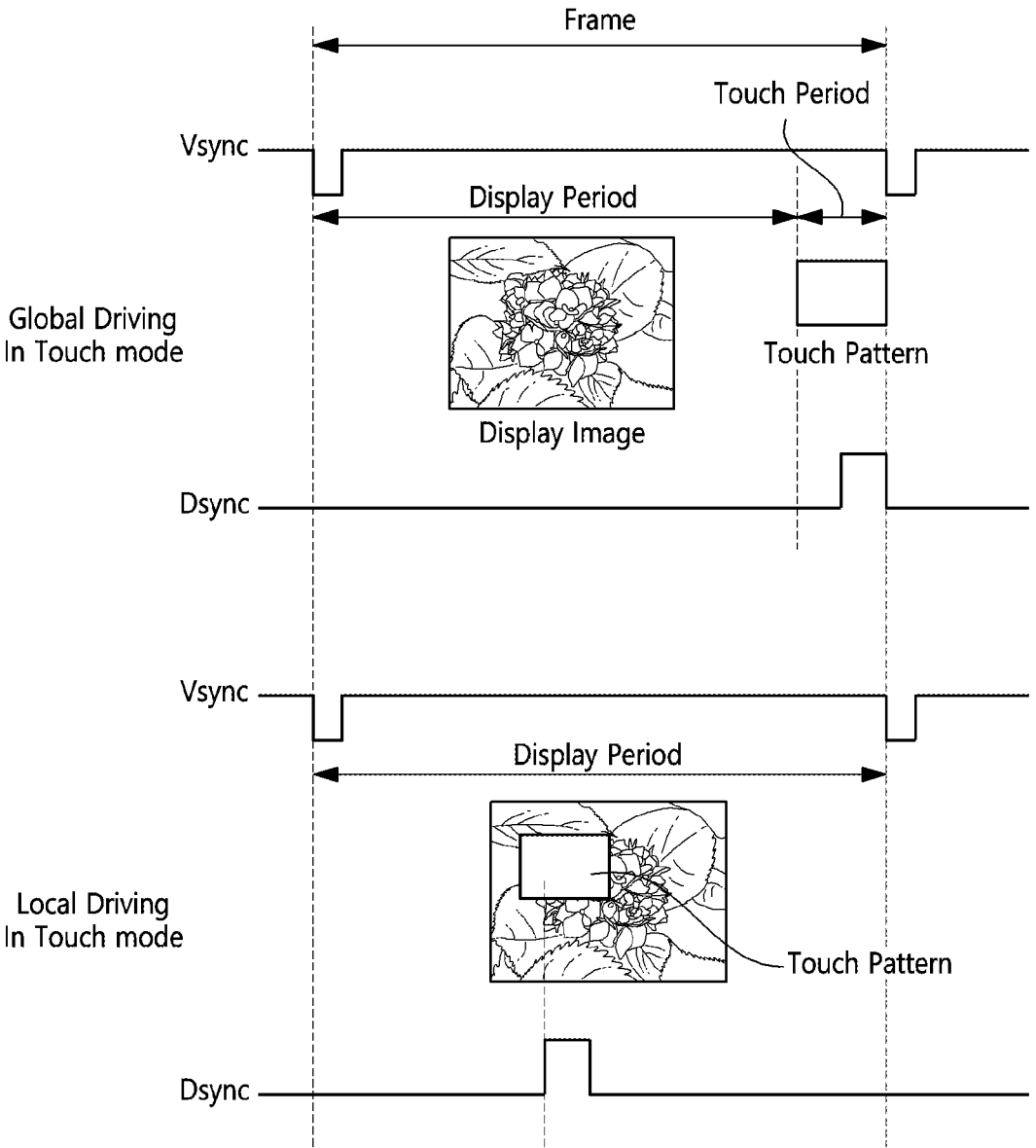
FIG. 15 is a conceptual diagram illustrating processes in which a global operation and a local operation are performed in the touch driving method according to embodiments of the disclosure.

FIG. 15 is a conceptual diagram illustrating processes in which a global operation and a local operation are performed in the touch driving method according to embodiments of the disclosure.

Referring to FIG. 15, the touch display device 100 according to embodiments of the disclosure may operate in normal mode and touch mode.

In normal mode, 1 frame period divided by a vertical synchronization signal Vsync corresponds to a display period, and an image is displayed on the display panel 110 during the display period.

On the other hand, 1 frame period is divided into a display period and a touch period in touch mode. An image is displayed on the display panel 110 in the display period, and a touch pattern is displayed on the display panel 110 in the touch period.

The touch display device 100 may operate in normal mode while contact with the stylus 200 is not detected, and may operate in touch mode while contact with the stylus 200 is detected.

In order to detect an initial position of the stylus 200 in touch mode, a touch pattern may be displayed on the entire display panel.

The stylus 200 may detect the contact of the touch display device 100 by the touch sensor 220, and the touch display device 200 may switch from normal mode to touch mode by using the contact data transmitted from the stylus 200 through the communication circuit 150.

Alternatively, when touch electrodes are disposed on the touch display device 100, it may be possible to switch from normal mode to touch mode by using touch sensing signals detected through the touch electrodes.

At this time, the stylus 200 may generate coordinate data by detecting the touch pattern displayed on the display panel 110 using the detection synchronizing signal Dsync while the touch pattern is displayed on the display panel 110 in the touch period.

After the initial position of the stylus 200 is detected, a touch pattern may be displayed on a local area depending on the touch coordinates. At this time, the remaining area except for the local area where the touch pattern is displayed may display an image.

At this time, the detection synchronizing signal Dsync may be generated to correspond to the time when the touch pattern is displayed on the display panel 110.

The timing controller 140 of the touch display device 100 may divide frame periods through a vertical synchronization signal Vsync and supply the detection synchronizing signal Dsync to the stylus 200 through the communication circuit 150. This allows the touch pattern to be detected in the touch period.

The detection synchronizing signal Dsync may be generated at the time after the touch pattern is displayed on the display panel 110 within the touch period.

Embodiments of the disclosure described above are briefly described below.

A touch display device according to embodiments of the disclosure may comprise a display panel including a plurality of subpixels, a driving circuit configured to drive the display panel, and a timing controller configured to control a normal mode that displays an image, or a touch mode that displays an image and a touch pattern depending on a touch state of a stylus.

A frame period is divided into a display period and a touch period, and the touch mode displays the touch pattern to be recognized by the stylus in the touch period.

The touch mode includes a first touch mode in which the touch period is included in every frame period.

The touch mode includes a second touch mode in which the touch period is included at a plurality of frame intervals.

The touch period is 10% to 30% of the frame period.

The touch mode switches alternately a first touch mode in which the touch period is included in every frame period and a second touch mode in which the touch period is included at a plurality of frame intervals.

The touch period includes a pattern display period in which scan signals are supplied from the driving circuit to the plurality of subpixels and the touch pattern is displayed on the display panel, and a pattern detecting period in which the stylus detects the touch pattern.

A width of a scan signal supplied to the display panel is controlled depending on a length of the touch period in the display period.

The width of the scan signal in the normal mode is greater than the width of the scan signal in the display period in the touch mode.

The width of the scan signal in the display period of the touch mode is greater than the width of the scan signal in a period displaying the touch pattern in the touch mode.

A level of a driving current flowing through the subpixel is controlled depending on the width of the scan signal.

A data voltage supplied to the plurality of subpixels in the display period of the touch mode is greater than a data voltage supplied to the plurality of subpixels in the normal mode for same image data.

The touch pattern includes cell areas where subpixels for displaying an encryption pattern are located, and guide lines where subpixels for dividing the cell areas are located.

The cell areas are displayed with different encryption patterns for each area divided by the guidelines.

The guide lines are areas where the touch patterns are arranged at regular intervals.

A global operation that detects a touch on the entire area of the display panel or a local operation that detects a touch on a local area adjacent to touch coordinates of the stylus is performed in the touch mode.

Also, a touch driving method according to embodiments of the disclosure may include a step of determining whether a stylus is touched, a step of operating in normal mode for displaying an image when there is no touch by the stylus, a step of operating in touch mode for displaying an image and a touch pattern when there is a touch by the stylus, a step of determining coordinates of the stylus in the touch mode, and a step of tracking touch positions of the stylus.

A first touch mode in which a touch period for displaying the touch pattern is included in every frame period and a second touch mode in which the touch period is included at a plurality of frame intervals are performed alternately in a step of operating in the touch mode.

A step of operating in the touch mode includes a global operation for displaying the touch pattern on the entire display panel, and a local operation for displaying the touch pattern in a local area based on coordinates of the stylus.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
a display panel including a plurality of subpixels;
a driving circuit configured to drive the display panel; and
a timing controller configured to control a normal mode of operation to display a first image or a touch mode of operation to display a second image in a display period and to display a touch pattern including coordinate information, based on a touch state of a stylus,
wherein a frame period includes the display period and a touch period in the touch mode,
wherein the touch mode is configured to display the touch pattern to be recognized by the stylus in the touch period, and
wherein a width of a scan signal supplied to the display panel is controlled based on a length of the touch period in the touch mode.

2. The touch display device of claim 1, wherein the touch mode includes a first touch mode in which the touch period is included in every frame period.

3. The touch display device of claim 1, wherein the touch mode includes a second touch mode in which the touch period is included in a plurality of frame intervals.

4. The touch display device of claim 1, wherein the touch period is 10% to 30% of the frame period.

5. The touch display device of claim 1, wherein the touch mode is configured to switch alternately between a first touch mode in which the touch period is included in every frame period and a second touch mode in which the touch period is included in a plurality of frame intervals.

6. The touch display device of claim 1, wherein the touch period includes:
a pattern display period in which scan signals are supplied from the driving circuit to the plurality of subpixels and the touch pattern is displayed on the display panel; and
a pattern detecting period in which the stylus detects the touch pattern.

7. The touch display device of claim 1, wherein a width of the scan signal in the normal mode is greater than a width of the scan signal in the display period in the touch mode.

8. The touch display device of claim 1, wherein a width of the scan signal in the display period of the touch mode is greater than a width of the scan signal in the touch period displaying the touch pattern in the touch mode.

9. The touch display device of claim 1, wherein a level of a driving current flowing through the subpixel is configured to be controlled depending on the width of the scan signal.

10. The touch display device of claim 1, wherein a data voltage supplied to the plurality of subpixels in the display period of the touch mode is configured to be greater than a data voltage supplied to the plurality of subpixels in the normal mode for same image data.

11. The touch display device of claim 10, wherein a data voltage supplied to the plurality of subpixels in the touch period in the touch mode is lower than a data voltage supplied to the plurality of subpixels in the normal mode for same image data.

12. The touch display device of claim 1, wherein the touch pattern includes:

cell areas where subpixels for displaying an encryption pattern are located; and guide lines where subpixels for dividing the cell areas are located.

13. The touch display device of claim 12, wherein the respective cell areas divided by the guide lines are displayed with different encryption patterns.

14. The touch display device of claim 13, wherein the guide lines are located at areas between the encryption patterns arranged at regular intervals.

15. The touch display device of claim 1, wherein a global operation that detects a touch on the entire area of the display panel or a local operation that detects a touch on a local area adjacent to touch coordinates of the stylus is configured to be performed in the touch mode.

16. A touch driving method, comprising:

determining whether there is a touch by a stylus;

operating in normal mode for displaying a first image when there is no touch by the stylus;

operating in touch mode for displaying a second image and a touch pattern including coordinate information when there is a touch by the stylus;

determining coordinates of the stylus in the touch mode; and tracking touch positions of the stylus, wherein a frame period includes a display period and a touch period in the touch mode, wherein the touch mode is configured to display the touch pattern to be recognized by the stylus in the touch period, wherein a width of a scan signal supplied to a display panel is controlled based on a length of the touch period in the touch mode.

17. A touch sensing system, comprising:

a display panel including a plurality of subpixels;

a stylus that senses contact or proximity with the display panel;

a driving circuit configured to drive the display panel; and a timing controller configured to control a normal mode that displays a first image, or a touch mode that displays a second image and a touch pattern including coordinate information depending on a touch state of the stylus;

wherein the touch pattern includes:

cell areas where subpixels for displaying an encryption pattern are located; and guide lines where subpixels for dividing the cell areas are located, wherein a frame period includes a display period and a touch period in the touch mode, wherein the touch mode is configured to display the touch pattern to be recognized by the stylus in the touch period, wherein a width of a scan signal supplied to the display panel is controlled based on a length of the touch period in the touch mode.

* * * * *